(No Model.)
G. W. RUSSELL.
CATTLE STANCHION.
No. 361,785. Patented Apr. 26, 1887.
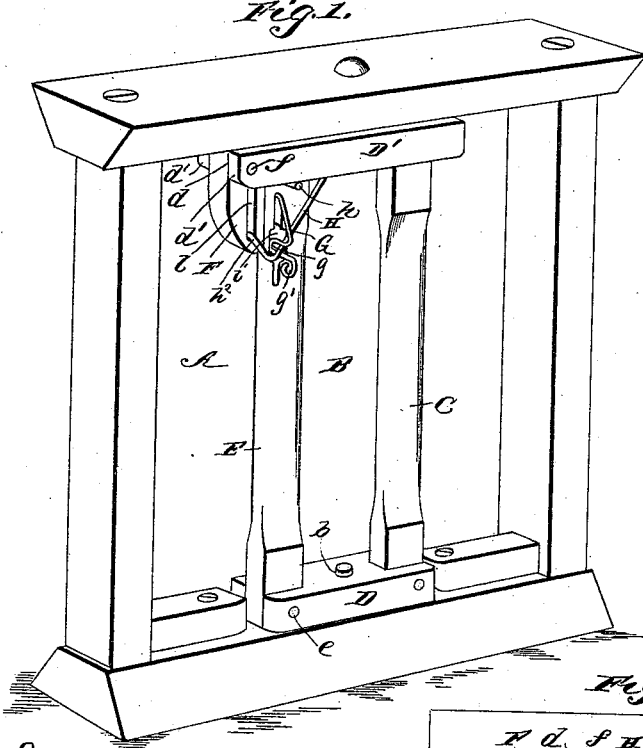
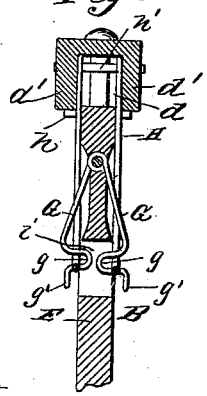
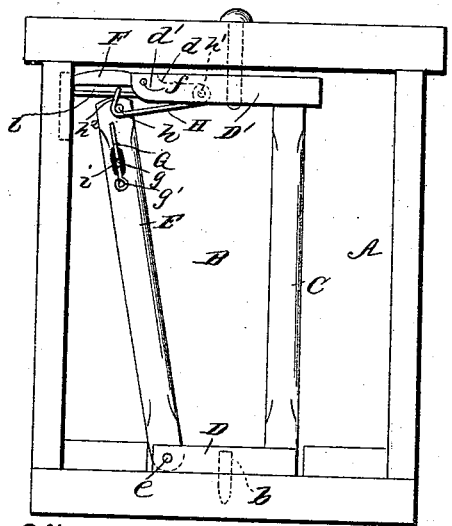
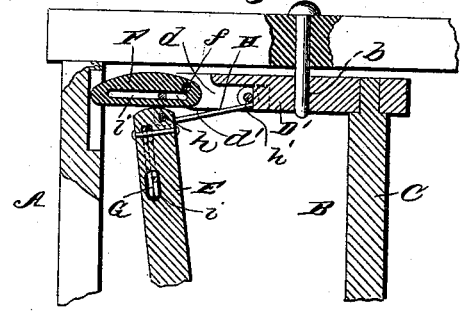
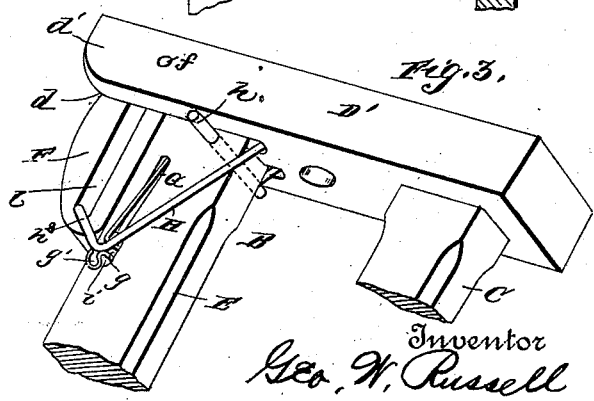
Witnesses
Inventor
Geo. W. Russell
By his Attorneys

UNITED STATES PATENT OFFICE.

GEORGE WILLIAM RUSSELL, OF COLDWATER, MICHIGAN.

CATTLE-STANCHION.

SPECIFICATION forming part of Letters Patent No. 361,785, dated April 26, 1887.

Application filed January 21, 1887. Serial No. 225,002. (No model.)

*To all whom it may concern:*

Be it known that I, GEORGE WILLIAM RUSSELL, a citizen of the United States, residing at Coldwater, in the county of Branch and State of Michigan, have invented new and useful Improvements in Cattle-Stanchions, of which the following is a specification.

My invention relates to improvements in cattle-stanchions; and it consists of the peculiar and novel construction and combination of the various parts for service, substantially as hereinafter fully set forth, and particularly pointed out in the claims.

The object of my invention is to provide an improved locking device for securing the movable post of a stanchion in place, and which can be operated very easily and quickly to release the cattle and to confine them in place, and to provide an improved stanchion which shall be very simple and strong in construction, effective in operation, and cheap.

In the accompanying drawings, Figure 1 is a perspective view of my invention. Fig. 2 is a side elevation of my improved stanchion, showing the pivoted post unlocked. Fig. 3 is a detached perspective view of the locking device, showing a portion of the frame. Fig. 4 is a vertical sectional view through the locking device, showing its position when unlocked. Fig. 5 is a transverse section.

Referring to the drawings, in which like letters of reference denote corresponding parts in all the figures, A designates a portion of the cattle stall or frame, in which my improved stanchion B is arranged to swing horizontally, the upper and lower cross-bars of the stanchion-posts being pivoted, as at $b$, in the stall-frame A.

C designates the rigid stanchion-post, which is secured in any preferred manner to the horizontal bars D D' at the ends thereof, and E is the movable stanchion-post, which is pivoted at its lower end to the outer free end of the bar D, as at $e$. The free end of the horizontal bar D' is slotted, as at $d$, for a portion of its length, and between the free ends of the arms $d'$, provided by the slotted portion of the bar D', is pivoted one end of a latch, F, as at $f$, the said latch being arranged to swing outwardly on its pivot, to enable the pivoted stanchion-post to be adjusted to release the cattle confined by the stanchion, and also to be adjusted to a vertical position to confine the said pivoted stanchion-post in place, all as will be presently described.

The upper end of the pivoted post E is provided with a stop, $h$, that is secured thereto near its rear edge, and this stop preferably comprises a transverse pin that passes through the post and projects outwardly therefrom on its opposite sides. The pivoted stanchion-post is further provided near the upper end with spring-catches G, which are arranged on opposite sides thereof. These catches are preferably made from a single piece of wire, the free ends of which are bent at their outer ends to provide a loop or lip, $g$, and a finger-piece, $g'$. One end of each of the spring-catches is secured to the pivoted stanchion-post, and the other end thereof, that is provided with the lip $g$, is left free, and is normally pressed inwardly within a transverse slot, $i$, of the pivoted stanchion-post. The lips of the free ends of the latches thus extend toward each other in the pivoted post, while the finger-pieces $g'$ lie on opposite sides thereof.

H designates a pivoted bail, which is arranged at the outer end of the bar D'. The inner ends of the swinging bail H are pivoted within the slotted portion of the bar D', as at $h'$, and the outer free ends of the bail are bent at an angle to the body thereof, to provide the angular lips $h^2$, which are connected together, as shown. The swinging latch F is slotted longitudinally near one edge, as at $i$, and in this slot works or slides the connecting-bar of the angular lips of the swinging bail H.

This being the construction, the operation of my invention is as follows: When the pivoted stanchion-post is locked in place, the upper end thereof fits between the arms of the slotted end of the bar D', and the swinging latch F assumes a vertical position, while the swinging bail H is inclined and slides over and is retained by the bent loops $g$ of the spring-catches G. To release the animal the spring-catches are first pressed inwardly by hand, so that the free end of the pivoted bail can be swung upwardly, and the outer end of the latch F moves with the upward movement of the bail, the connected ends of the bail riding in the slot of the latch F. The free end of the pivoted stanchion-post can now be moved outwardly to enlarge the space between the posts E C, and allow the animal to withdraw its head from between the posts, and the outward movement of the pivoted post is limited by the stops thereof coming in contact with the angular lips of the swinging bail or links. To confine the animal between the posts of the stanchion, its head is first inserted between the same and the free end of the pivoted post moved inwardly within the slotted end of the bar D', and the free end of the pivoted latch F is then forced downwardly, and carries with it the free end of the swinging bail, which rides over the spring-catches and engages with the loops g thereof, without requiring to be adjusted in engagement therewith by the hands of the operator.

From the foregoing description, taken in connection with the drawings, it will be seen that I provide an improved stanchion with a locking device that can be very quickly and easily operated to confine and release the animal, and that great freedom of motion is permitted the animal, inasmuch as the stanchion can swing horizontally and the animal can move his head vertically between the posts.

Having thus fully described my invention, what I claim as new, and desire to secure by Letters Patent, is—

1. In a stanchion, the combination of a pivoted lower bar, D, a pivoted slotted bar, D', a post rigidly connected to the said bars, a pivoted post connected to the bar D and adapted to ride in the slot of the bar D', a slotted latch pivoted to the slotted bar D', a bail connected to the bar D' and riding in the slot of the latch, and a catch carried by the pivoted post and arranged in the path of the bail to lock the latter and the latch when they have been adjusted, as and for the purpose described.

2. In a stanchion, the combination of a pivoted bar, D, a slotted bar, D', a fixed post connecting the said bars, a swinging post, E, pivoted to the bar D, a latch, F, pivoted in the slotted end of the bar D' and having a longitudinal slot, i, a bail, H, pivoted to the bar D' at a point in rear of the pivot-connection of the latch F, and having the angular ends riding in the longitudinal slot of the latch, a fixed stop, h, on the upper end of the swinging post E and adapted to come in contact with the angular ends of the bail, to thereby limit the outward movement of the said post, and a spring carried by the swinging post, to engage the bail and lock the latter and the latch, as and for the purpose set forth.

3. In a stanchion, the combination of the pivoted cross-bars D D', the latter having a slot in its free end, a post rigidly secured to said bars, a post pivoted to the bar D and provided at its upper free end with spring-catches G, having the inwardly-extending loops g' and the finger-piece at their free ends, the pin h, fixed to the free end of the swinging post E at a point above the catches, a slotted latch, F, pivoted to the free end of the slotted bar D', and a bail, H, pivoted within the slot of the bar D' at a point in rear of the pivot-connection of the latch F thereto, and having the connected ends sliding in the slot of the latch, as and for the purpose described.

In testimony that I claim the foregoing as my own I have hereto affixed my signature in presence of two witnesses.

GEORGE WILLIAM RUSSELL.

Witnesses:
LLEWELLYN S. DANIELS,
JOHN BIYER.